(12) United States Patent
Chen et al.

(10) Patent No.: US 12,147,146 B2
(45) Date of Patent: Nov. 19, 2024

(54) FLASHLIGHT, CAMERA AND ELECTRONIC DEVICE

(71) Applicant: SHENZHEN NEEWER TECHNOLOGY CO. LTD, Shenzhen (CN)

(72) Inventors: Haixin Chen, Shenzhen (CN); Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 163 days.

(21) Appl. No.: 17/978,750

(22) Filed: Nov. 1, 2022

(65) Prior Publication Data
US 2023/0408891 A1  Dec. 21, 2023

(30) Foreign Application Priority Data

May 30, 2022 (CN) .......................... 202221327254.0

(51) Int. Cl.
*G03B 15/05* (2021.01)
*G02B 7/28* (2021.01)

(52) U.S. Cl.
CPC ............... *G03B 15/05* (2013.01); *G02B 7/28* (2013.01); *G03B 2215/0567* (2013.01)

(58) Field of Classification Search
CPC ... G03B 15/05; G03B 2215/0567; G02B 7/28
USPC ....................................................... 315/291
See application file for complete search history.

(56) References Cited

U.S. PATENT DOCUMENTS

| 4,251,753 | A | * | 2/1981 | Kondo | H05B 41/32 |
| | | | | | 315/219 |
| 4,444,483 | A | * | 4/1984 | Nakajima | G03B 7/26 |
| | | | | | 396/206 |
| 6,005,352 | A | * | 12/1999 | Odaka | H05B 41/32 |
| | | | | | 396/164 |
| 6,147,460 | A | * | 11/2000 | Ichihara | H05B 41/32 |
| | | | | | 315/219 |
| 6,219,493 | B1 | * | 4/2001 | Aoki | G03B 15/05 |
| | | | | | 396/206 |
| 6,404,989 | B2 | * | 6/2002 | Odaka | H05B 41/325 |
| | | | | | 396/206 |
| 6,584,286 | B2 | * | 6/2003 | Odaka | H05B 41/325 |
| | | | | | 396/206 |

(Continued)

*Primary Examiner* — Ryan Jager
(74) *Attorney, Agent, or Firm* — Westbridge IP LLC

(57) ABSTRACT

Disclosed are a flashlight, a camera and an electronic device. The flashlight includes a control module, a first drive module, a first boost module, a voltage signal unit and a tube body. The control module is for outputting a control signal, the first drive chip is for receiving the control signal and outputting a first drive signal according to the control signal, the first boost module is for receiving the first drive signal and outputting a first voltage signal according to the first drive signal, the voltage signal unit is for receiving the first voltage signal and outputting the first voltage signal to the tube body for charging, the first drive chip is further for detecting a current feedback signal of the first boost module, and for outputting an adjusting signal according to the current feedback signal to change the current feedback signal.

8 Claims, 3 Drawing Sheets

(56) References Cited

U.S. PATENT DOCUMENTS

| | | | | |
|---|---|---|---|---|
| 6,718,135 B2* | 4/2004 | Kawasaki | ............. | G03B 15/05 |
| | | | | 396/182 |
| 6,826,365 B1* | 11/2004 | Constable | ............. | G03B 15/05 |
| | | | | 396/206 |
| 6,828,803 B2* | 12/2004 | Ichimasa | ............. | H05B 41/325 |
| | | | | 396/206 |
| 7,443,141 B2* | 10/2008 | Ichimasa | ............. | G03B 15/05 |
| | | | | 320/166 |
| 8,160,435 B2* | 4/2012 | Okubo | ............. | G03B 15/05 |
| | | | | 396/201 |
| 9,400,413 B2* | 7/2016 | Yamashita | ............. | G03B 15/03 |
| 10,728,965 B1* | 7/2020 | Shum | ............. | H02J 7/345 |
| 2008/0211420 A1* | 9/2008 | Walker | ............. | H05B 41/34 |
| | | | | 315/238 |
| 2013/0004152 A1* | 1/2013 | Imafuji | ............. | H04N 23/56 |
| | | | | 396/155 |
| 2016/0202597 A1* | 7/2016 | Chen | ............. | F21L 4/00 |
| | | | | 362/8 |
| 2023/0408891 A1* | 12/2023 | Chen | ............. | G03B 15/05 |

\* cited by examiner

FLASHLIGHT, CAMERA AND ELECTRONIC DEVICE

CROSS-REFERENCE TO RELATED APPLICATIONS

This application claims priority to Chinese Patent Application No. 202221327254.0, filed on May 30, 2022, the entire contents of which are incorporated herein by reference.

TECHNICAL FIELD

The present disclosure relates to the technical field of flashlight, and in particular to a flashlight, a camera and an electronic device.

BACKGROUND

Nowadays, the flashlight is commonly provided with a boost module and an energy storage capacitor, and the energy storage capacitor is charged through the boost module. However, voltages of both sides of the energy storage capacitor is unstable and is usually excessive when the circuit is working, so that the energy storage capacitor is easy to be damaged, thus how to provide a flashlight that can protect the energy storage capacitor inside the flashlight becomes an urgent problem to be solved.

SUMMARY

The present disclosure aims to solve at least one of the existing technical problems. Thus, the present disclosure provides a flashlight that can protect the energy storage capacitor inside the flashlight.

The present disclosure further provides a camera that includes the above flashlight.

The present disclosure further provides a device that includes the above camera.

According to the flashlight in the first embodiment of the present disclosure, the flashlight includes a control module, a first drive module, a first boost module, a voltage signal unit and a tube body; the first drive module includes a first drive chip, the voltage signal unit includes a capacitor; the control module is connected to the first drive chip, the first boost module is connected to the first drive chip, the voltage signal unit is connected to the first boost module, the tube body is connected to the voltage signal unit; the control module is for outputting a control signal, the first drive chip is for receiving the control signal and outputting a first drive signal according to the control signal, the first boost module is for receiving the first drive signal and outputting a first voltage signal according to the first drive signal, the voltage signal unit is for receiving the first voltage signal and outputting the first voltage signal to the tube body for charging, and the first drive chip is further for detecting a current feedback signal of the first boost module, and for outputting an adjusting signal according to the current feedback signal to change the current feedback signal.

According to the flashlight in the embodiments of the present disclosure, the flashlight provided in the present disclosure includes at least one of the following beneficial technical effects: a capacitor of the voltage signal unit is charged by providing the control module, the first drive module and the first boost module, and the output current of the first boost module is adjusted through the first drive module to avoid the output voltage of the first boost module to be excessive, so that that the energy storage capacitor is protected and the safety of using the flashlight is improved.

According to some embodiments of the present disclosure, the flashlight further includes a second boost module connected to the control module, and the second boost module is for outputting a second voltage signal.

According to some embodiments of the present disclosure, the flashlight further includes the flashlight further includes a second drive module, the second drive module includes a second drive chip; the second drive chip is connected with the second boost module and the tube body respectively, the second drive chip is for receiving the second voltage signal and changing the work condition of the tube body according to the second voltage signal.

According to some embodiments of the present disclosure, the flashlight further includes a third drive module, the third drive module includes a step motor; the third drive module is connected to the control module, and the control module is further for controlling a displacement of the step motor.

According to some embodiments of the present disclosure, the flashlight further includes a third drive module, the third drive module includes a step motor; the third drive module is connected to the control module, and the control module is further for controlling a displacement of the step motor.

According to some embodiments of the present disclosure, the tube body is mechanically connected to the step motor, and the step motor is for changing a position of the tube body.

According to some embodiments of the present disclosure, the flashlight further includes a communication module for communicating and interacting with a plurality of the flashlights.

According to some embodiments of the present disclosure, the flashlight further includes a light emitting diode (LED) fill light for supplementing light.

According to some embodiments of the present disclosure, the flashlight further includes a laser-assisted focus light for outputting a laser grating dot to assist focusing.

According to the camera in the second embodiment of the present disclosure, the camera includes the flashlight of the first embodiment.

According to the camera in the embodiments of the present disclosure, the camera provided in the present disclosure includes at least one of the following beneficial technical effects: the camera adopts the above flashlight, and the capacitor of the voltage signal unit is charged by providing the control module, the first drive module and the first boost module, and the output current of the first boost module is adjusted through the first drive module to avoid the output voltage of the first boost module to be excessive, so that that the energy storage capacitor is protected and the safety of using the flashlight is improved.

According to the electronic device in the third embodiment of the present disclosure, the electronic device includes the camera of the second embodiment.

According to the electronic device in the embodiments of the present disclosure, the electronic device provided in the present disclosure includes at least one of the following beneficial technical effects: the electronic device adopts the above camera, and the capacitor of the voltage signal unit is charged by providing the control module, the first drive module and the first boost module, and the output current of the first boost module is adjusted through the first drive module to avoid the output voltage of the first boost module to be excessive, so that that the energy storage capacitor is protected and the safety of using the flashlight is improved.

The additional aspects and the advantages of the present disclosure will be illustrated in the following description, part of the illustration will be obvious in the following description and will be understood through the practice of the present disclosure.

BRIEF DESCRIPTION OF THE DRAWINGS

The present disclosure is further described with reference to the accompanying drawings and embodiments.

DETAILED DESCRIPTION OF THE EMBODIMENTS

The embodiments of the present disclosure will be specifically described, and the examples of the embodiments will be shown in the accompanying drawings, where the same or similar labels through all the disclosure represent the same or similar elements or elements having the same or similar functions. The embodiments described below by reference to the accompanying drawings are exemplary and are intended only to explain the present disclosure and are not to be understood as limitations of the present disclosure.

In the description of the present disclosure, it should be understood that, the descriptions that refers to direction such as direction instructions or position relationship, up, down, front, rear, left, right, etc. are the direction or position relationship based on the accompanying drawings, and are only for convenience and simplicity of description, and are not intended to indicate or imply that the device or elements being referred to must be in a particular direction, constructed or operated in a particular direction, and therefore should not be understood as a limit to the present disclosure.

In the description of the present disclosure, the definition of "a plurality of" is more than one, the definition of "several" is more than two, bigger, smaller, more than, etc. are understood to exclude the original number, over, under, within, etc. are understood to include the original number. If the first, second are described, they are used only for the purpose of distinguishing technical features, and they cannot be understood as indicating or implying relative importance or implicitly indicating the quantity of the indicated technical features or the priority of the indicated technical features.

In the description of the present disclosure, unless otherwise specified, the term such as "providing", "assembling", "connecting" should be understood in a broad sense, those skilled in the art may reasonably determine the specific meaning of the above terms in the present disclosure in combination with the specific content of the technical solution.

In the description of the present disclosure, with reference to the description of terms "an embodiment", "some embodiments", "exemplary embodiments", "example", "specific example", or "some examples", etc. the combination of the embodiment or the specific features, structures, materials or characteristics of the example description is included in at least one embodiment or at least one example of the present disclosure. In this specification, the indicating description of the above terms does not necessarily refer to the same embodiments or examples. Furthermore, the specific characteristics, structures, materials, or features described may be combined in any one or more embodiments or examples in a suitable way.

Figure 1:
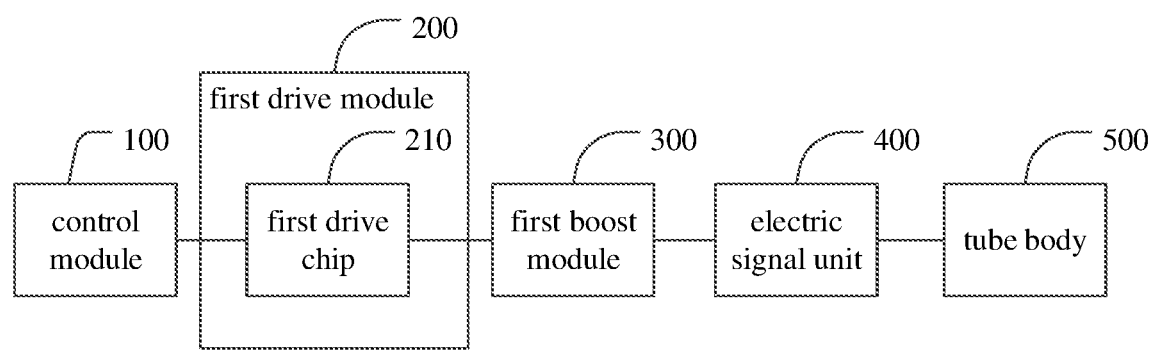
FIG. 1 is a schematic diagram of modules of a flashlight according to an embodiment of the present disclosure.

As shown in FIG. 1, the flashlight in the embodiment of the present disclosure includes a control module 100, a first drive module 200, a first boost module 300, a voltage signal unit 400 and a tube body 500; the first drive module 100 includes a first drive chip 210, the voltage signal unit 400 includes a capacitor; the control module 100 is connected to the first drive chip 210, the first boost module 300 is connected to the first drive chip 210, the voltage signal unit 400 is connected to the first boost module 300, the tube body 500 is connected to the voltage signal unit 400; the control module 100 is for outputting a control signal, the first drive chip 210 is for receiving the control signal and outputting a first drive signal according to the control signal, the first boost module 300 is for receiving the first drive signal and outputting a first voltage signal according to the first drive signal, the voltage signal unit 400 is for receiving the first voltage signal and outputting the first voltage signal to the tube body 500 for charging, the first drive chip 210 is further for detecting a current feedback signal of the first boost module 300, the first drive chip 210 is further for outputting an adjusting signal according to the current feedback signal to change the current feedback signal. Specifically, the control module 100 includes a Micro Controller Unit (MCU) main control chip, the MCU main control chip is provided with a detecting pin (the detecting pin is HV-CHECK), during the working process of the circuit, when a voltage of the HV-CHECK pin is detected to be a preset voltage value through the MCU main control chip, then the voltage of both ends of the capacitor of the voltage signal unit 400 reaches a preset voltage value (the preset voltage value is 300V), then a corresponding signal indicator light is turned on to indicate that the tube body 500 can be operated to flash. When the voltage value of the HV-CHECK pin is detected to be lower than the preset voltage value through the MCU main control chip, then the voltage of both ends of the capacitor of the voltage signal unit 400 does not reach the preset voltage value (the preset voltage value is 300V), then the corresponding signal indicator light is turned off, and the control signal is outputted to the first drive chip 210 through the MCU main control chip, it should be noted that, the first drive chip 210 is provided with a CHARGING-EN pin, and the control signal outputted through the MCU main control chip is for controlling the electric level condition of the CHARGING-EN pin. When the capacitor of the voltage signal unit 400 is needed to be charged, a first control signal is outputted to the first drive chip 210 through the MCU main control chip to change the electric level condition of the CHARGING-EN pin, then the first drive chip 210 output a first drive signal to conduct the first boost module 300. The first boost module 300 includes a flyback boost transformer. The voltage of two ends of the flyback boost transformer will reaches to 330V when conducted, then the capacitor of the voltage signal unit 400 will be charged to 330V, and the capacitor of the voltage signal unit 400 will further output the 330V voltage to the tube body 500 to turn the tube body 500 into a to-flash state. Besides, the first drive chip 210 is provided with a detecting pin (the pin is IS), an output current of the first boost module 300 can be detected through the IS pin, when a current feedback value of the first boost module 300 is detected to be over a preset current value through the IS pin, the first drive chip 210 will output the adjusting signal to the first boost module 300 to lower an output current value of the first boost module 300, thus to protect the voltage of both ends of the capacitor of the voltage signal unit 400 from being over the preset value, and avoid the power of the circuit to be in an overcurrent state. It should be noted that, the power is a 7.2V lithium-ion battery.

Figure 2:
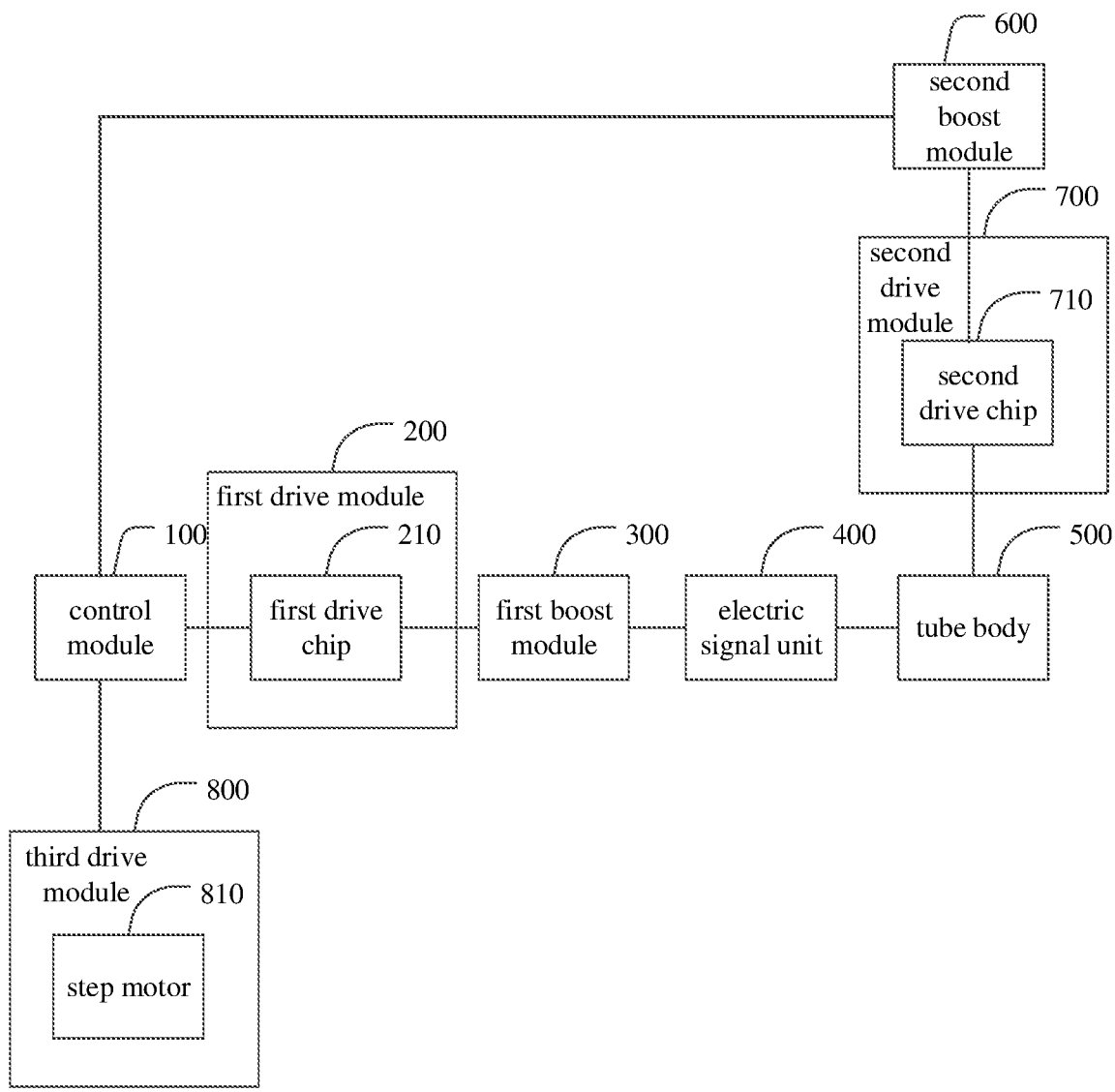
FIG. 2 is a schematic diagram of modules of the flashlight according to another embodiment of the present disclosure.

As shown in FIG. 2, in some embodiments, the flashlight further includes a second boost module 600; the second boost module 600 is connected with a control module 100 and is for outputting a second voltage signal. In the working process of the circuit, the second boost module 600 can be applied with a Direct Current (DC)-DC booster, which is for boosting the voltage supplied by the power to the preset voltage, such as, the 7.2V voltage is boosted to 18.5V voltage.

As shown in FIG. 2, in some embodiments, the flashlight further includes a second drive module 700, the second drive module 700 includes a second drive chip 710 connected to the second boost module 600 and the tube body 500 respectively, the second drive chip 710 is for receiving a second voltage signal and for changing the working state of the tube body 500 according to the second voltage signal. Specifically, the second drive chip 710 is an Insulated Gate Bipolar Transistor (IGBT) drive chip, when the tube body 500 is needed to flash and the tube body 500 is on the to-flash state, a preset voltage (such as 18.5V voltage) is outputted to the IGBT drive chip through the DC-DC booster, so that the IGBT drive chip is conducted, and the tube body 500 is further to operate the flashing process.

As shown in FIG. 2, in some embodiments, the flashlight further includes a third drive module 800, the third drive module 800 includes a step motor 810, and the third drive module 800 is connected to the control module 100 for control the displacement of the step motor 810.

In some embodiments, the tube body is mechanically connected with the step motor 810, and the step motor is for changing the position of the tube body 500. Specifically, the displacement of the step motor 810 can be controlled through the control module 100, the step motor 810 is mechanically connected with the tube body 500, so that the step motor 810 is assembled with the tube body 500, then the tube body 500 can be displaced by controlling a working state of the step motor 810, thus to change the position of the tube body 500, and a lighting range of the flashlight can be adjusted by changing the position of the tube body 500.

Figure 3:
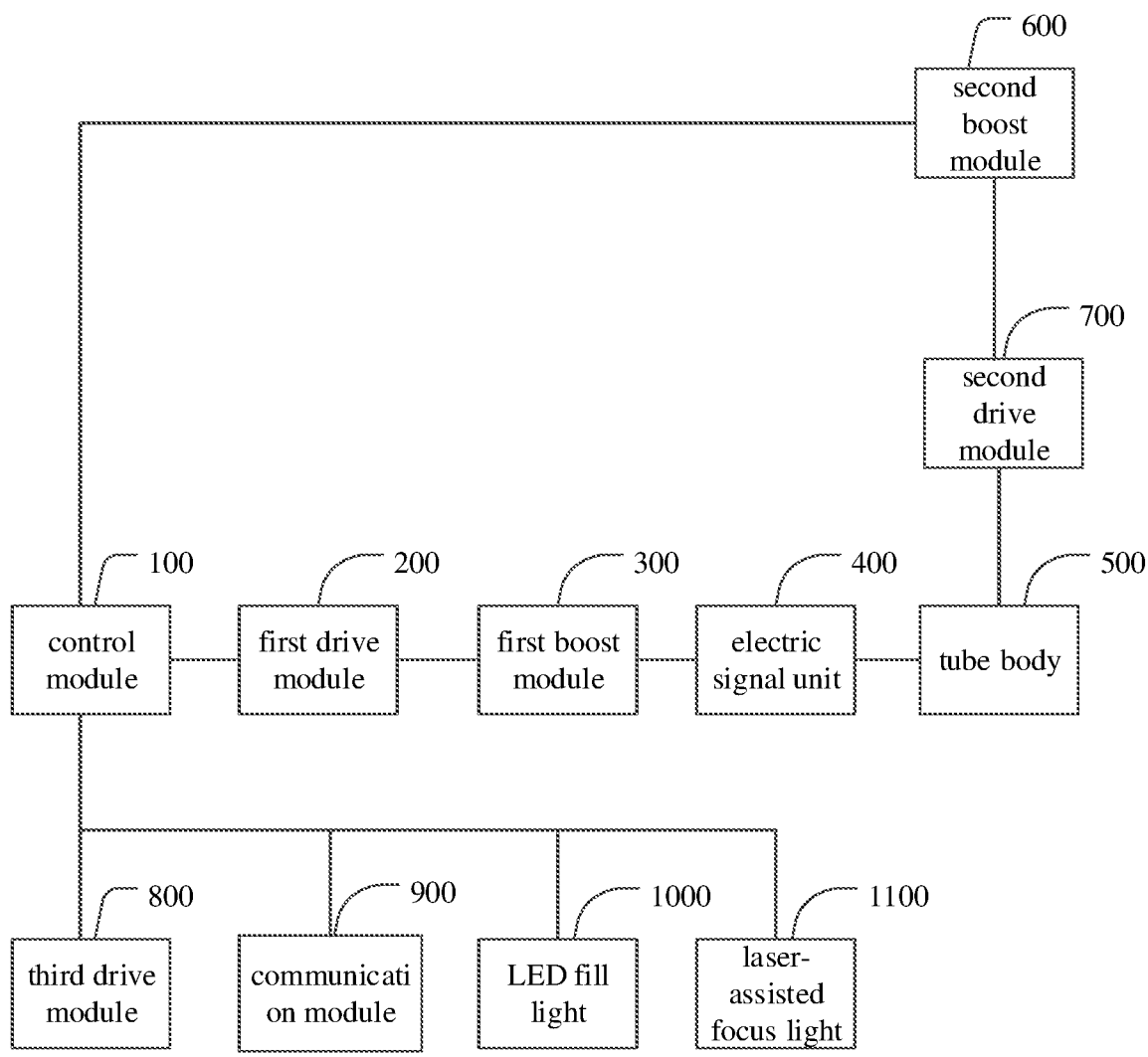
FIG. 3 is a schematic diagram of modules of the flashlight according to still another embodiment of the present disclosure.

As shown in FIG. 3, in some embodiments, the flashlight further includes a communication module 900 for a plurality of flashlights to communicate and interact. Specifically, the circuit is provided with a communication module 900, the flashlight is mounted on a hot-shoe of the camera, so that the flashlight can communicate and interact with the camera, such as, a flash intensity of the flashlight can be controlled to reach an effect of being as a fill light. Besides, the communication module 900 includes 2.4 GHz, 433 MHz, WiFi, bluetooth main controller/wireless receiving module, by providing a control panel on the outer section of the flashlight, the control panel is provided as a main controlling mode, and the plurality of flashlights are turned into a receiving mode, then the related parameters of the plurality of the flashlights can be remotely adjusted. If a display screen is provided on the control panel, the preset working parameter of the flashlight can be obtained by the display screen. It should be noted that, a preset working parameter of the flashlight includes but not limited to a working mode of the flashlight, a displacement of the step motor 810, a flash intensity of the flashlight. The working mode of the flashlight includes but not limited to an auto flash mode, a manual mode and a multi mode. Besides, an alarming module is further provided in the circuit, when the voltage of the both ends of the tube body is so high that the temperature is also overheated, then a backlight color of the display screen turns into a preset alarming color and a buzzer of the alarming module is triggered to alarm.

As shown in FIG. 3, in some embodiments, the flashlight further includes an LED fill light 1000 for supplementing light. When the flashlight is assembled on a camera and when an ambient light is low, the LED fill light 1000 can be turned on to supplement light.

As shown in FIG. 3, in some embodiments, the flashlight further includes a laser-assisted focus light 1100 for outputting a laser grating dot to assist focusing. When the flashlight is assembled on the camera and when the ambient light is low or the camera is hard to focus, the laser-assisted focus light 1100 can be turned on to cast red grating dots to assist the camera to focus.

In some other embodiments, the flashlight is further provided with a Universal Serial Bus (USB) interface, so that the camera is convenient to be upgraded and optimized by connecting to a computer, a mobile phone and other terminals through the USB interface. Besides, the flashlight is further provided with a PC interface which includes but not limited to a 2.5 mm interface, a UMC ¼ interface, etc.

The present disclosure further provides a camera, and the camera includes the flashlight as described above.

The camera adopts the flashlight of the above embodiments, and the capacitor of the voltage signal unit 400 is charged by providing the control module 100, the first drive module 200 and the first boost module 300, and the output current of the first boost module 300 is adjusted through the first drive module 200 to avoid the output voltage of the first boost module 300 to be excessive, so that that the energy storage capacitor is protected and the safety of using the flashlight is improved.

The present disclosure further provides an electronic device, and the electronic device includes the camera as described above.

The electronic device adopts the camera of the above embodiments, the capacitor of the voltage signal unit 400 is charged by providing the control module 100, the first drive module 200 and the first boost module 300, and the output current of the first boost module 300 is adjusted through the first drive module 200 to avoid the output voltage of the first boost module 300 to be excessive, so that that the energy storage capacitor is protected and the safety of using the flashlight is improved.

The embodiments of the present disclosure have been described in detail above with reference to the accompanying drawings, but the present disclosure is not limited to the described embodiments. For those skilled in the art, without departing from the principles of the present disclosure, the various changes can be made to the embodiments. Besides, the embodiments of the present disclosure and the technical features mentioned in the embodiments could be combined with each other if they are not contradictory.

What is claimed is:

1. A flashlight, comprising:
   a control module;
   a first drive module comprising a first drive chip connected to the control module;
   a first boost module connected to the first drive chip;
   a voltage signal unit comprising a capacitor and connected to the first boost module;
   a tube body connected to the voltage signal unit;

a second boost module connected to the control module; and a second drive module comprising a second drive chip, wherein the control module is for outputting a control signal, the first drive chip is for receiving the control signal and outputting a first drive signal according to the control signal, the first boost module is for receiving the first drive signal and outputting a first voltage signal according to the first drive signal, the voltage signal unit is for receiving the first voltage signal and outputting the first voltage signal to the tube body for charging, the first drive chip is further for detecting a current feedback signal of the first boost module, and for outputting an adjusting signal according to the current feedback signal to change the current feedback signal, the second boost module is for outputting a second voltage signal, the second drive chip is connected with the second boost module and the tube body respectively, and the second drive chip is for receiving the second voltage signal and changing a work condition of the tube body according to the second voltage signal.

2. The flashlight of claim 1, further comprising:

a third drive module comprising a step motor, wherein the third drive module is connected to the control module, and the control module is further for controlling a displacement of the step motor.

3. The flashlight of claim 2, wherein the tube body is mechanically connected to the step motor, and the step motor is for changing a position of the tube body.

4. The flashlight of claim 1, further comprising:

a communication module for communicating and interacting with a plurality of the flashlights.

5. The flashlight of claim 4, further comprising:

a light emitting diode (LED) fill light for supplementing light, wherein the LED fill light is connected to the control module.

6. The flashlight of claim 5, further comprising:

a laser-assisted focus light for outputting a laser grating dot to assist a camera in focusing on a target, wherein the laser-assisted focus light is connected to the control module.

7. A camera, comprising the flashlight of claim 1.

8. An electronic device, comprising the camera of claim 7.

* * * * *